(No Model.)
F. T. HOVEY.
ADJUSTABLE ANGLE TROWEL.
No. 398,781. Patented Feb. 26, 1889.
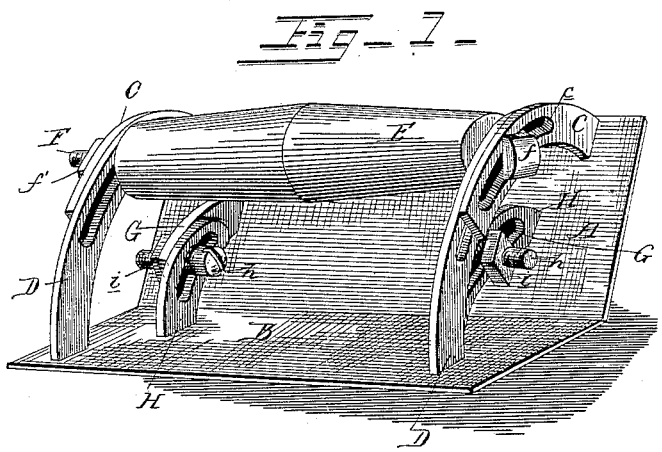
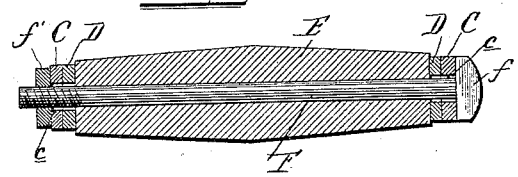

United States Patent Office.

FRANCIS T. HOVEY, OF HOMER, NEW YORK.

ADJUSTABLE ANGLE-TROWEL.

SPECIFICATION forming part of Letters Patent No. 398,781, dated February 26, 1889.

Application filed December 5, 1888. Serial No. 292,730. (No model.)

*To all whom it may concern:*

Be it known that I, FRANCIS T. HOVEY, a citizen of the United States, residing at Homer, in the county of Cortland and State of New York, have invented certain new and useful Improvements in Adjustable Angle-Trowels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement in corner-trowels, the object being to provide means for holding the leaves or sections of the trowel firmly in their adjusted positions, thus insuring neat corner-work.

The invention consists in the features of construction hereinafter fully described, and pointed out in the claim.

In the drawings, Figure 1 is a view in perspective of my improved trowel. Fig. 2 is a detail view of a portion of the device.

A and B indicate the leaves or sections of the trowel jointed together, as shown.

C C represent curved arms secured to the leaf A, and formed with elongated slots $c$.

D D represent similar arms secured upon the leaf B, and adapted to overlap the arms C C.

E is the trowel-handle, formed with an opening throughout its length to receive a rod or bolt, F. This rod is provided at one end with a head, $f$, and is screw-threaded at its other end to receive a nut, $f'$. The rod F passes through the slots of the arms C C and D D through the handle E, and is secured by the nut $f'$ after the leaves of the trowel have been properly adjusted.

G G represent short curved arms secured upon the leaf A, and slotted to receive securing-bolts.

H H indicate similar slotted arms secured upon the leaf B. These short arms G G and H H are located close to the hinge-joint of the trowel, and are held together by short bolts or screws $h\ h$ and nuts $i\ i$.

By the construction thus described the outer portion of the leaves are firmly braced in their adjusted position, and the rod extending through the handle relieves the curved arms of a considerable part of the strain.

The short curved arms serve to brace the inner parts of the leaves, and thus the whole device is thoroughly braced and secured in whatever position the leaves are adjusted to.

I claim—

A corner-trowel consisting of the hinged leaves, the overlapping short arms and their securing-bolts and nuts, the overlapping long arms, the handle E, and the securing and strengthening headed rod, and nut $f'$, substantially as set forth.

In testimony whereof I affix my signature in presence of two witnesses.

FRANCIS T. HOVEY.

Witnesses:
 BEN S. CURRAN, Jr.,
 D. S. RICHARDS.